(12) United States Patent
Nakano et al.

(10) Patent No.: US 7,223,989 B2
(45) Date of Patent: May 29, 2007

(54) RADIATION IMAGE CONVERSION PANEL

(75) Inventors: Kuniaki Nakano, Uenohara-machi (JP); Shigetami Kasai, Hino (JP); Hideki Shibuya, Tokyo (JP); Masashi Kondo, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 297 days.

(21) Appl. No.: 10/963,490

(22) Filed: Oct. 12, 2004

(65) Prior Publication Data

US 2005/0082495 A1   Apr. 21, 2005

(30) Foreign Application Priority Data

Oct. 21, 2003  (JP)  ............................. 2003-360455
Oct. 22, 2003  (JP)  ............................. 2003-361864

(51) Int. Cl.
G03B 42/08 (2006.01)

(52) U.S. Cl. .................................................. 250/484.4
(58) Field of Classification Search ............. 250/484.4, 250/585
See application file for complete search history.

(56) References Cited

U.S. PATENT DOCUMENTS

| 5,534,710 | A | * | 7/1996 | Suzuki | 250/588 |
| 5,591,982 | A | * | 1/1997 | Kohda | 250/484.4 |
| 5,880,476 | A | * | 3/1999 | Suzuki | 250/484.4 |
| 6,462,352 | B1 | * | 10/2002 | Matsumoto et al. | 250/582 |
| 2003/0155529 | A1 | * | 8/2003 | Morikawa et al. | 250/484.4 |
| 2004/0149932 | A1 | * | 8/2004 | Nakano et al. | 250/484.4 |
| 2004/0183029 | A1 | * | 9/2004 | Honda et al. | 250/484.4 |

* cited by examiner

Primary Examiner—David Porta
Assistant Examiner—Mark R. Gaworecki
(74) Attorney, Agent, or Firm—Lucas & Mercanti, LLP (57) ABSTRACT

A radiation image conversion panel is disclosed, comprising a support having thereon a stimulable phosphor layer formed by vapor deposition of a stimulable phosphor, wherein the stimulable phosphor layer meets the following requirement:

$$0 \leq B \leq 90 A^{-0.17}$$

wherein A is a thickness (μm) of the stimulable phosphor layer and B is a transmittance (%) of a stimulating light or a stimulated emission.

14 Claims, 4 Drawing Sheets

RADIATION IMAGE CONVERSION PANEL

FIELD OF THE INVENTION

The present invention relates to a radiation image conversion panel having a stimulable phosphor layer which has been formed through gas phase deposition.

BACKGROUND OF THE INVENTION

Conventionally, digitized radiation images have been obtained from an object by a radiation image conversion method using a radiation image conversion panel having a stimulable phosphor layer. The radiation image conversion method is referred to as a process in which a radiation having passed through an object is irradiated onto the stimulable phosphor layer to allow radiation energies corresponding to radiation transmission densities of various parts of the object to be accumulated in a stimulable phosphor and the radiation energies accumulated in the stimulable phosphor are emitted by stimulating light, then, the intensity of the thus stimulated emission is converted to electric signals, which are visualized as an image through image recording material such as photosensitive material or image displaying devices such as CRT (cathode ray tube) or LCD (liquid crystal display).

Recently, there has been developed a technique to obtain a radiation image conversion panel exhibiting extremely high sensitivity in which a stimulable phosphor layer is formed on a support through vapor deposition using a stimulable phosphor composed of CsBr as a crystalline parent component, for example, as described in JP-A No. 2001-249149 (hereinafter, the term, JP-A refers to a Japanese Patent Application Publication).

It is also known that formation of a stimulable phosphor layer composed of fine columnar crystals achieves enhanced sharpness. The fine columnar crystals accomplish a light guidance effect and cause stimulating light to reach the bottom of the columnar crystals with preventing scattering of the stimulating light, thereby achieving enhanced sharpness of the image of stimulated emission.

Accordingly, to obtain a radiation image conversion panel exhibiting enhanced sensitivity and sharpness, there has been desired enhancement of crystallinity of the stimulable phosphor layer and a stimulable phosphor layer exhibiting high transmittance for stimulating light and/or stimulated emission light.

SUMMARY OF THE INVENTION

However, AX type phosphors which are comprised of parent component alkali halide such as CsBr and activated with Eu or the like, generally exhibit relatively high thermal expansion coefficient and enhancing crystallinity results in tendency of easy peeling from the support and lowering in shock resistance.

Accordingly, it is an object of this invention to provide a radiation image conversion panel with enhanced sensitivity, superior sharpness and improved shock resistance.

In one aspect the present invention is directed to a radiation image conversion panel comprising a stimulable phosphor layer formed by gas phase deposition, wherein the stimulable phosphor layer meets the following requirement (1) with respect to transmittance of stimulating light and/or stimulated emission light:

$$0 \leq B \leq 90 A^{-0.17}$$

wherein A is a thickness (expressed in μm) of the stimulable phosphor layer and B is a transmittance (expressed in %) of a stimulating light or a stimulated emission.

DETAILED DESCRIPTION OF THE INVENTION

Figure 1:
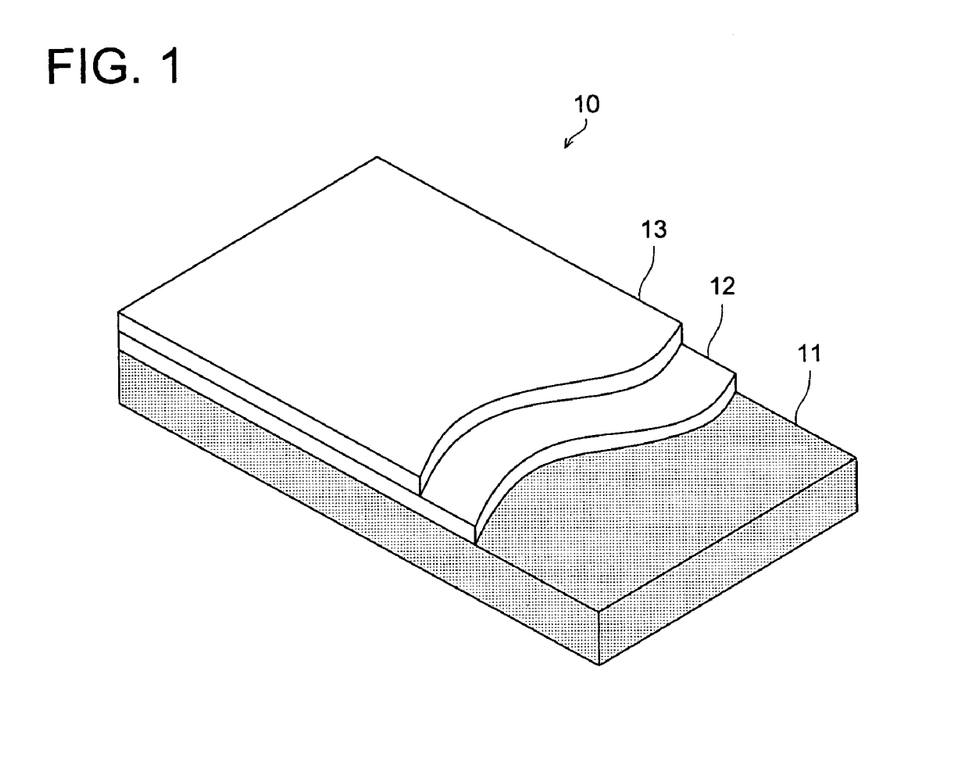
FIG. 1 illustrates a radiation image conversion panel.

As shown in FIG. 1, a radiation image conversion panel (10) comprises a support (11) provided thereon with a stimulable phosphor layer (12) comprising a stimulable phosphor formed of columnar crystals. The columnar crystals are formed by crystal growth of a stimulable phosphor through gas phase deposition. There may optionally be provided a protective layer (13) on the stimulable phosphor layer to protect the stimulable phosphor layer.

The support (11) which can be optimally chosen from commonly known materials used for a support of conventional radiation image conversion panels, preferably is a quartz glass sheet, a sheet of metal such as aluminum, iron, tin, or chromium or a carbon fiber-reinforced resin sheet in terms of forming the stimulable phosphor layer (12) by a process of gas phase deposition.

The support preferably has a resin layer to smoothen the surface thereof. Thus, the resin layer preferably contains compounds such as polyimide, polyethylene terephthalate, paraffin and graphite and the layer thickness is preferably 5 μm to 50 μm. The resin layer may be provided on the surface of the support, the opposite side or both sides thereof. Means for providing a resin layer on the support include, for example, a pasting method and a coating method. In the pasting method, a pressure roller is employed, in which heating is made preferably at a temperature of 80 to 150° C. under a pressure of 4.90×10 to 2.94×10² N/cm at a transporting speed of 0.1 to 2.0 m/sec.

In the stimulable phosphor layer, the transmittance of stimulating light and/or stimulated emission light meets the following equation (1), preferably equation (3) and more preferably equation (4), thereby providing high sensitivity, enhanced sharpness and improved shock resistance to the radiation image conversion panel:

$$0 \leq B \leq 90 A^{-0.17} \quad (1)$$

$$0 \leq B \leq 90 A^{-0.22} \quad (3)$$

$$90 A^{-0.65} \leq B \leq 90 A^{-0.22} \quad (4)$$

wherein A is a thickness (μm) of a stimulable phosphor layer, and B is a transmittance (or percent transmission) of stimulating light and/or stimulated emission light.

It is preferred that the transmittance of stimulating light is greater than that of stimulated emission, thereby leading to enhanced resistance to shock.

The transmittance of stimulating light and stimulated emission light of the stimulable phosphor layer is defined as an average of measured values obtained by measurement of arbitrarily chosen 30 points on the stimulable phosphor layer (12) formed on transparent glass, using a spectrophotometer (e.g., HITACHI Type 557 Spectrophotometer).

The thickness (A) is an average of measured values obtained by measurement of arbitrarily chosen 25 points on the stimulable phosphor layer, obtained using a film thickness meter (e.g., MIIAX DH-120, produced by Tokyo Seimitsu Co., Ltd.).

In one preferred embodiment of this invention, when the transmittance of stimulating light is higher than that of stimulated emission light, Shock resistance of the stimulable phosphor layer (12) is further enhanced.

The stimulating light is one which is irradiated when reading out images from the radiation image conversion panel (10) and the wavelength thereof preferably is 500 to 900 nm. It is specifically preferred to use a stimulating light of 680 nm, which results in extremely superior sharpness.

There can be used a laser light source as a stimulating light source. Examples of a laser light source include a semiconductor laser, He—Ne laser, He—Cd laser, Ar ion laser, Kr ion laser, $N_2$ laser, YAG laser and a second harmonic, ruby laser, various dye lasers and metal vapor lasers such as copper vapor laser. When the scanning time per pixel of a radiation image conversion panel is synchronized with the pulse, a pulsed laser is also usable.

Specifically, semiconductor lasers exhibit high output power, thereby enhancing a stimulating light intensity and resulting in enhanced stimulated emission efficiency. Semiconductor lasers can also simplify an optical system constitution, leading to compactification of a device.

Stimulated emission is luminescence emitted when a stimulable phosphor returns from the excitation state to the ground state and stimulable phosphors relating to this invention exhibit a peak wavelength of from 300 to 500 nm.

The distribution of transmittance of stimulating light and/or stimulated emission is preferably within ±20%.

The distribution of transmittance (hereinafter, also denoted as transmittance distribution) is defined by the following equation (5):

transmittance distribution (%)=[(max−min)/(max+min)]×100       (5)

wherein "max" and "min" represent maximum and minimum values of transmittance, respectively, when transmittance was measured with respect to 30 points arbitrarily chosen within the stimulable phosphor layer. A transmittance distribution within ±20% results in uniform crystallinity, thereby leading to minimized unevenness in sensitivity as well as enhanced resistance to shock.

Further, it is preferred that the transmittances are isotropically distributed outwardly from the center of the stimulable phosphor layer toward the edge of the stimulable phosphor layer.

Figure 2:
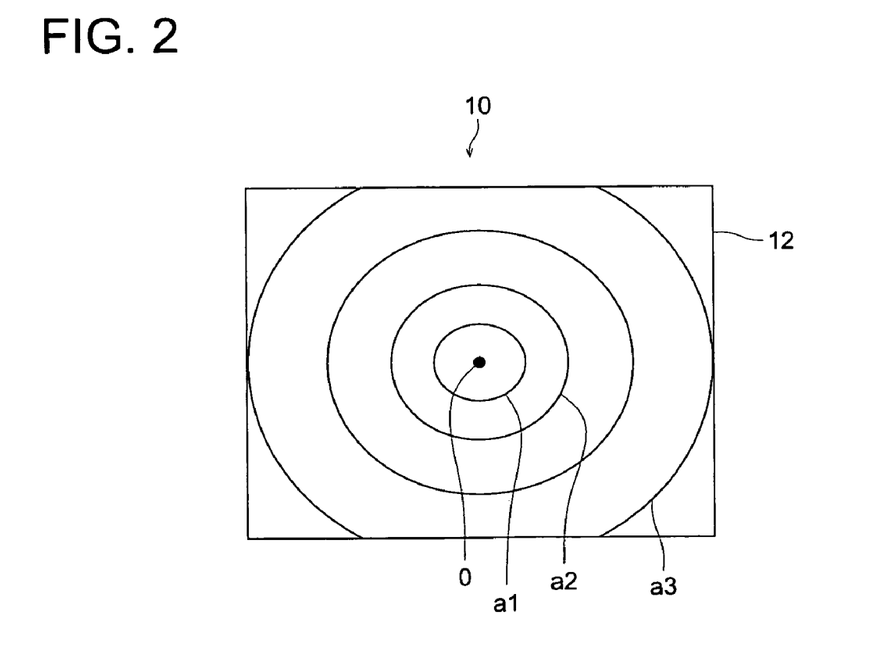
FIGS. 2, 3 and 4 illustrate distribution characteristics of transmittance.
Figure 3:
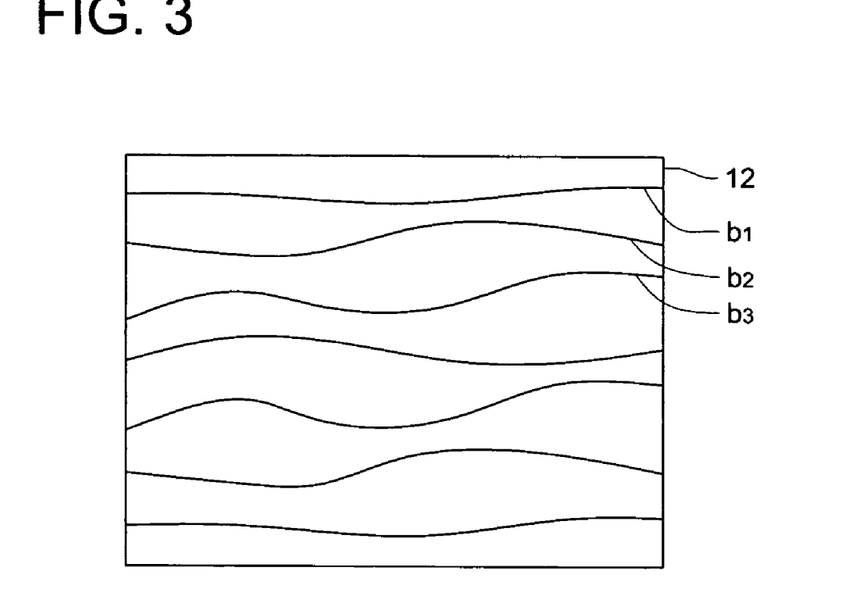
Figure 4:
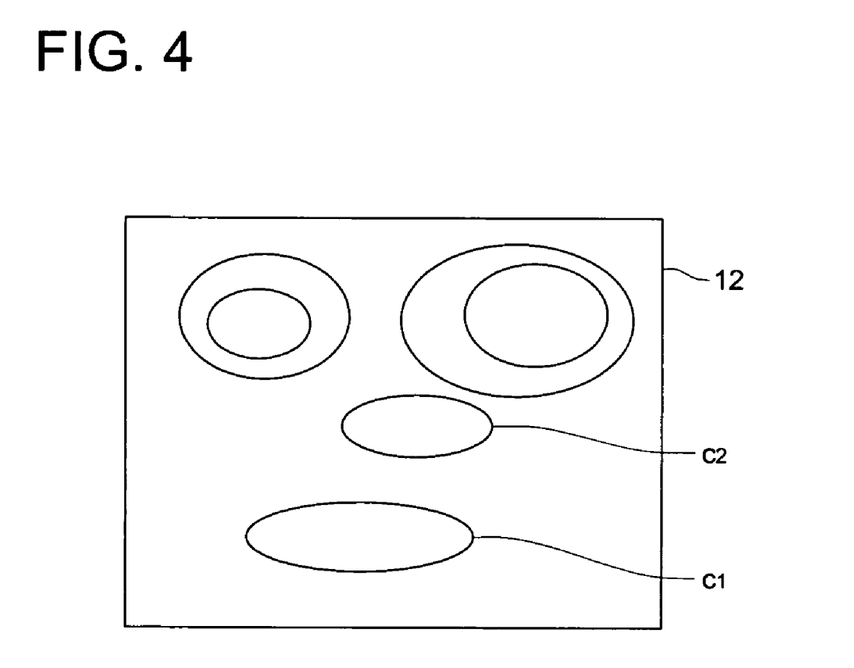

The expression, the transmittances being isotropically distributed means that when concentric circles are drawn from the center (o), as shown in FIG. 2, the transmittance is substantially constant on the circumference of a circle which is at an equal distance from the center. In other words, as shown in FIG. 2, equivalent transmittance lines a1, a2 and a3 are arranged on concentric circles or ellipses. On the contrary, when equivalent transmittance lines b1, b2 and b3, or c1 and c2, as shown in FIGS. 3 and 4, the distribution of transmittances is not isotropic but it is defined to be anisotropic in this invention.

The stimulable phosphor layer (12) as shown in FIG. 1 preferably contains a stimulable phosphor comprised of an alkali halide as a parent, which is represented by the following formula (2):

$M^1X \cdot aM^2X'_2 \cdot bM^3X''_3 : eA$       (2)

wherein $M^1$ represents an alkali metal selected from the group consisting of Li, Na, K, Rb and Cs; $M^2$ represents a divalent metal selected from the group consisting of Be, Mg, Ca, Sr, Ba, Zn, Cd, Cu and Ni; $M^3$ represents a trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each represent a halogen atom selected from the group consisting of F, Cl, Br and I; A represents a metal selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are respectively 0≦a<0.5, 0≦b<0.5 and 0<e≦0.2.

In the stimulable phosphor represented by the foregoing formula (2), $M^1$ is an alkali metal selected from the group consisting of Li, Na, K, Rb and Cs, preferably an alkali metal selected from the group consisting of Rb and Cs, and more preferably a Cs atom.

$M^2$ is a divalent metal selected from the group consisting of Be, Mg, Ca, Sr, Ba, Zn, Cd, Cu and Ni; and preferably a divalent metal selected from the group consisting of Be, Mg, Ca, Sr and Ba.

$M^3$ is a trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; and preferably a trivalent metal atom selected from the group consisting of Y, Ce, Sm, Eu, Al, La, Gd, Lu, Ga and In.

A is a metal selected from the group consisting of Eu, Tb, In, Ce, Tm, Dy, Pr, Ho, Nd, Yb, Er, Gd, Lu, Sm, Y, Tl, Na, Ag, Cu and Mg; of these, Eu atom is preferred.

X, X' and X" each represent a halogen atom selected from the group consisting of F, Cl, Br and I; a halogen atom selected from the group consisting of F, Cl and Br is preferred and Br atom is more preferred.

In the foregoing formula (1), b is 0≦b<0.5 and preferably 0≦b<$10^{-2}$.

The stimulable phosphor layer (12) may use any stimulable phosphor represented by the foregoing formula (2) and the use of CsBr:xEu is preferred in terms of high sensitivity and enhanced sharpness, which corresponds to $M^1$=Cs, X=Br, a=0, b=0 and 0<x≦0.2 of formula (2).

Stimulable phosphors of the foregoing formula (1) can be prepared from the following raw materials (a) to (c) according to the procedure described below:

(a) one or more compounds selected from NaF, NaCl, NaBr, NaI, KF, KCl, KBr, KI, RbF, RbCl, RbBr, RbI, CsF, CsCl, CsBr, and CsI is usable;

(b) one or more compounds selected from $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaBr_2 \cdot 2H_2O$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$ is usable;

(c) Sc, Y, La, Ce, Pr, Nd, Pm, Sm, Eu, Gd, Tb, Dy, Ho, Er, Tm, Yb, Lu, Al, Ga and In.

Corresponding to the composition of a stimulable phosphor to be prepared, phosphor raw materials are optimally chosen from the foregoing (a) to (c), weighed so as to satisfy the numerical range of "a", "b" and "e" of the foregoing formula (1), and then dissolved. In this regard, there may be conducted sufficient mixing using a mortar, ball mill or mixer mill. Then, a prescribed amount of an acid is added to adjust a pH value (C) of the thus obtained solution so as to fall within the range of 0<C<7, and then water is evaporated.

Further, the obtained raw material mixture is charged into a heat-resistant vessel such as a silica crucible or an alumina crucible and then placed in an electric furnace to be calcined. The calcination temperature preferably is 500 to 1000° C. The calcination time, depending on the charged amount of raw materials, calcination temperature and the like, preferably is 0.5 to 6 hrs.

As a calcinations atmosphere is employed a weakly reducible atmosphere such as a nitrogen gas atmosphere containing a small amount of hydrogen gas or a carbon dioxide atmosphere containing carbon monoxide, a nitrogen gas atmosphere, a neutral atmosphere such as an argon gas atmosphere, or a trace amount of oxygen-introduced weakly oxidizing atmosphere.

After completion of calcination under the foregoing condition, calcined material is taken out of the electric furnace and pulverized. Thereafter, powdered calcined material may again be charged into a heat resistant vessel and then placed in an electric furnace to be recalcined under the foregoing condition to further enhance emission luminance of the phosphor. When the calcined material is allowed to cool from the calcination temperature to room temperature, the intended phosphor can be obtained by taking out the calcined material from the electric furnace and allowing it to stand in an aerial atmosphere. In this regard, the calcined material may also be cooled in the same atmosphere as in the calcination, such as a weakly reducing atmosphere or a neutral atmosphere. Alternatively, the calcined material is moved from a heating section to a cooling section within the electric furnace, followed by rapidly cooling in a weakly reducing atmosphere, neutral atmosphere or weakly oxidizing atmosphere, thereby leading to further enhanced stimulated emission luminance of the phosphor.

The stimulable phosphor layer (12) can be formed by depositing the stimulable phosphor on one side of the support (11) by applying gas phase deposition methods to grow columnar phosphor crystals until reaching a desired layer thickness. The gas phase deposition methods usable in this invention include a vacuum deposition method (or vacuum evaporation method), a sputter deposition method, a CVD method, an ion plating method and other appropriate methods. Of these, the vacuum deposition method is preferred.

Figure 5:
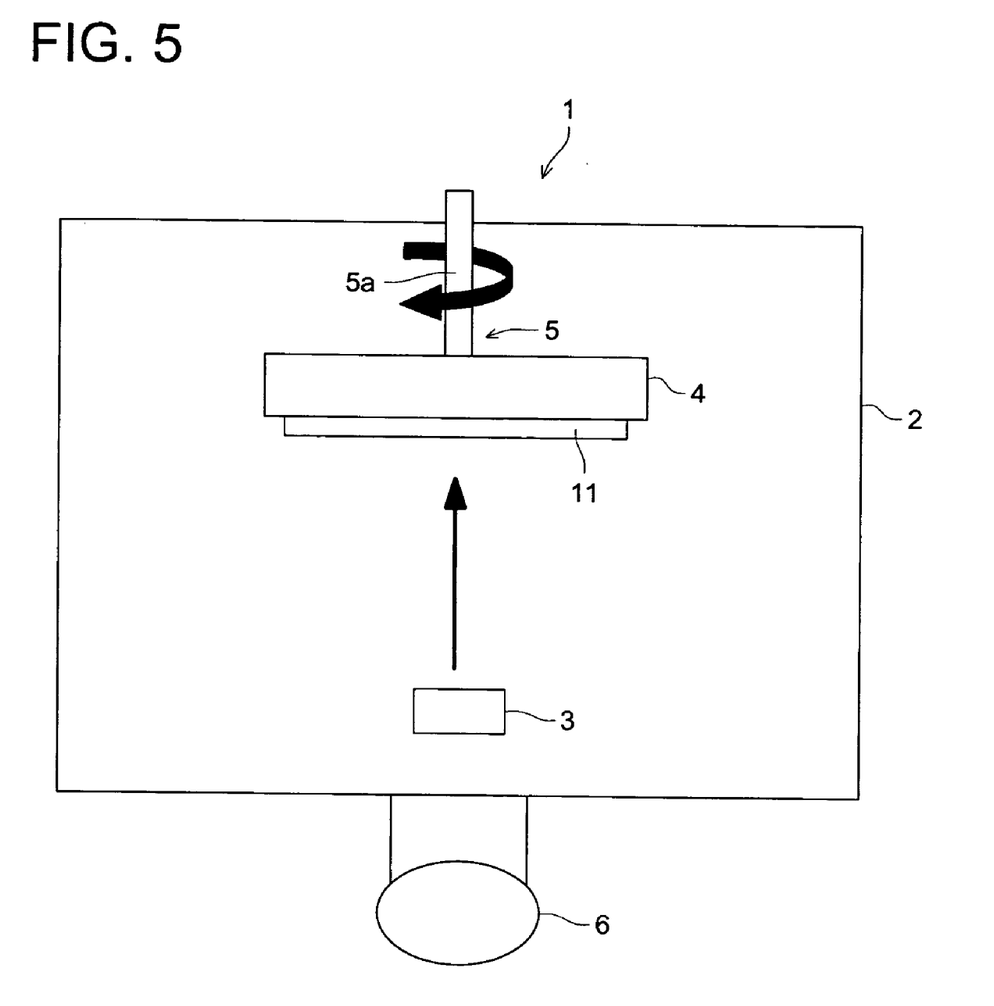
FIGS. 5 and 6 illustrate vacuum deposition apparatuses.

Vacuum deposition can be performed using, for example, a vacuum deposition apparatus (1) shown in FIG. 5. The vacuum deposition apparatus (1) is provided with a vacuum vessel (2) and a vacuum pump (6) to evacuate the inside of the vacuum vessel (12) and to introduce atmospheric air; the interior of the vacuum vessel (2) is provided with an evaporation source (3) to evaporate or sublimate a stimulable phosphor by heating to deposit the resulting vapor onto a support (11), a support holder (4) to hold the support (11) and a support rotation mechanism (5) to rotate the support holder (4) to the evaporation source (3). In the vacuum deposition apparatus (1), a vapor evaporated from the evaporation source (3) is deposited onto the support (11) with rotating the support holder (4) by the support rotation mechanism (5) to form the stimulable phosphor layer (12).

To hold a stimulable phosphor and heat it by a resistance heating method, the evaporation source (3) may be composed of an aluminum crucible wound by a heater, or a boat or a heater of a high-melting metal. Besides the resistance heating method, electron beam heating or high-frequency induction heating is also applicable to heat the stimulable phosphor. Specifically, the resistance heating method is preferred in terms of being a relatively simple constitution, ease of handling and low price, and being applicable to a large number of materials. Further, the evaporation source (3) may be a molecular beam source using a molecular source epitaxial method.

There may be provided a shutter between the support (11) and the evaporation source (3) to shield a space of from the evaporation source (3) to the support (11). Proving the shutter prevents an unintended material adhered onto the stimulable phosphor surface being evaporated at the initial stage of evaporation and its adherence to the support (11).

The support holder (4) is preferably provided with a heater to heat the support (11). Heating the surface of the support (11) can separate or remove material adsorbed onto the support surface, and preventing generation of an impurity layer between the support surface and the stimulable phosphor, promoting closer contact and optimizing film characteristics of the stimulable phosphor layer.

The support rotation mechanism (5) is composed of, for example, a rotating shaft (5a) which rotates a support holder (4) while holding the support holder (4) and a motor (not shown in FIG. 3) which is arranged outside the vacuum vessel (2) and acts as a driving source for the rotating shaft.

Using the vacuum deposition apparatus (1) as shown in FIG. 2, a stimulable phosphor layer (12) can be formed on a support (11) according to the following procedure. First, the support (11) is mounted on the support holder (4). Then, the interior of the vacuum vessel is evacuated and regulated to the intended degree of vacuum. A stimulable phosphor layer exhibiting superior transmittance can be obtained by controlling the degree of vacuum. A vacuum of is preferably from $1\times10^{-2}$ Pa to $1\times10^{-1}$ Pa and more preferably from $5\times10^{-2}$ Pa to $1\times10^{-1}$ Pa. Thereafter, the support holder is rotated toward the evaporation source (3) by the support rotation mechanism (5). When the vacuum vessel (2) reaches a vacuum allowing deposition, a stimulable phosphor is evaporated from the heated evaporation source (3) and deposits on the surface of the support (11) to grow the phosphor to the intended thickness. In this regard, the spacing between the support (11) and the evaporation source (3) preferably is 100 mm to 1500 mm, and more preferably not less than 400 mm, and still more preferably not more than 600 mm to enhance transmittance.

The foregoing deposition process may be divided to plural times to form a stimulable phosphor layer (12). Further, using plural resistance heaters or electron beams in the deposition process, co-deposition can be performed to form the stimulable phosphor layer (12) concurrently with synthesis of an intended stimulable phosphor on the support (11). The substrate [such as support (11), protective layer or an interlayer] may optionally be cooled or heated during deposition. After completion of the deposition, the stimulable phosphor layer (12) may optionally be heated. Further, there may be conducted vacuum deposition in which gases such as $O_2$ or $H_2$ are introduced during deposition.

The thickness of the stimulable phosphor layer (12), depending on the objective of a radiation image conversion panel or the kind of a stimulable phosphor, is preferably 50 to 2000 μm, more preferably 50 to 1000 μm, and still more preferably 100 to 800 μm to achieve the effects of this invention. Thinning the stimulable phosphor layer results in enhanced transmittance. In the formation of the stimulable phosphor layer (12) through the gas-phase deposition process, the support is preferably maintained at a temperature of room temperature (rt) to 300° C., and more preferably 50 to 200° C. during the formation of the stimulable phosphor layer (12). The transmittance of the stimulable phosphor layer (12) tends to increase as the temperature of the support (11) increases. The temperature of a support is preferably not more than 80° C., and more preferably not more than 100° C. to achieve effects of this invention.

After formation of the stimulable phosphor layer (12), a protective layer (13) as shown in FIG. 1 may optionally be provided on a side of the stimulable phosphor layer (12) opposite the support (11) to physically or chemically protect the stimulable phosphor layer (12). The protective layer may be formed by coating a coating solution as a protective layer on the surface of the stimulable phosphor layer (12) or by allowing a protective layer previously formed to adhere onto the stimulable phosphor layer (12). Materials used for the protective layer include those which are typically used for protective layers. Examples thereof include cellulose acetate, nitrocellulose, polymethyl methacrylate, polyvinyl butyral, polyvinyl formal, polycarbonate, polyester, polyethylene terephthalate, polyethylene, polyvinylidene chloride, nylon, polytetrafluoroethylene, polytrifluoroethylene, copolymer of tetrafluoroethylene and hexafluoropropylene, copolymer of vinylidene chloride and vinyl chloride, and copolymer of vinylidene chloride and acrylonitrile. Further, a transparent glass substrate may be used as a support. Furthermore, inorganic material such as SiC, $SiO_2$, SiN, and $Al_2O_3$ may be allowed to deposit by means of the vacuum evaporation or sputtering method to form the protective layer. The thickness of a protective layer is preferably 0.1 to 2,000 μm.

EXAMPLES

The present invention will be further described based on examples but embodiments of the invention are by no means limited to these examples.

Preparation of Radiation Image Conversion Panel

Example 1

Using a deposition apparatus (1) as shown in FIG. 2, a stimulable phosphor (CsBr: 0.0002Eu) was deposited on one side of support (11) formed of a carbon fiber reinforced resin to form a stimulable phosphor layer (12), according to the following procedure. Similarly, a stimulable phosphor layer (12) was also formed on a 0.5 mm thick transparent glass substrate (7059, product by Corning Corp.) to prepare a sample used for transmittance measurement.

First, a phosphor raw material was filled as deposition material into a resistance heating crucible, the support (11) is set on a rotating support holder (4) and the distance between the support (11) and an evaporation source (3) was adjusted to 800 nm. Subsequently, the inside of the deposition apparatus (1) was evacuated, then, Ar gas was introduced therein and the vacuum pressure was adjusted to a pressure of $1 \times 10^{-1}$ Pa, and the support (11) was maintained at a temperature of 100° C. while rotating the support (11) at a rate of 10 rpm. Then, the resistance-heating crucible was heated to deposit the stimulable phosphor onto the support and vacuum deposition was completed when the thickness of a stimulable phosphor layer (12) reached 500 µm. Subsequently, the stimulable phosphor layer (12) was put into a protective layer bag in a dry air atmosphere to obtain a radiation image conversion panel, as Example 1 relating to this invention, having a structure in which the stimulable phosphor layer was closely shielded.

Example 2

Radiation image conversion panel and its sample used for transmittance measurement were prepared similarly to Example 1, except that the distance between the support (11) and an evaporation source (3) was adjusted to 400 nm.

Example 3

Radiation image conversion panel and its sample used for transmittance measurement were prepared similarly to Example 1, except that the interior of the vacuum vessel (1) was adjusted to a vacuum of 0.01 Pa.

Example 4

Radiation image conversion panel and its sample used for transmittance measurement were prepared similarly to Example 1, except that the distance between the support (11) and an evaporation source (3) was adjusted to 1000 nm.

Example 5

Radiation image conversion panel and its sample used for transmittance measurement were prepared similarly to Example 1, except that the distance between the support (11) and an evaporation source (3) was adjusted to 1000 nm, and the thickness of the stimulable phosphor layer was adjusted to 300 µm.

Example 6

Radiation image conversion panel and its sample used for transmittance measurement were prepared similarly to Example 1, except that the distance between the support (11) and an evaporation source (3) was adjusted to 1000 nm, and the support temperature was maintained at 150° C.

Comparative Example 1

Radiation image conversion panel and its sample used for transmittance measurement were prepared similarly to Example 1, except that the support temperature was maintained at 200° C. and the interior of the vacuum vessel (1) was adjusted to a vacuum of 0.001 Pa.

Comparative Example 2

Radiation image conversion panel and its sample used for transmittance measurement were prepared similarly to Comparative Example 1, except that the thickness of the stimulable phosphor layer was adjusted to 300 µm.

EVALUATION

The thus obtained radiation image conversion panels Examples 1 to 6 and Comparative Examples 1 and 2 were each measured with respect to transmittance for stimulated emission (440 nm) and stimulating light (680 nm), and further evaluated with respect to shock resistance.

Transmittance

Using a spectrophotometer HITACHI type 557, measuring light was scanned in the range of 300 to 800 nm, the transmittance of the stimulable phosphor layer was measured with respect to stimulating light at the wavelength of 680 nm and stimulated emission at the wavelength of 440 nm under the following condition and the transmittance was determined based on the foregoing formula (19. Results thereof are shown in Table 1.

Measurement condition for transmittance

Wavelength of measuring light: 440 nm, 680 nm

Scanning speed: 120 nm/min

Number of repeating times: 10 times

Response: Auto

Number of measuring points: 30.

Shock Resistance

Radiation image conversion panel Examples 1 to 4 and Comparative Examples 1 and 2 were visually evaluated after a 500 g iron ball was dropped onto the respective panels. Further, the respective radiation image conversion panels were each exposed to X-rays at a bulb voltage of 80 k Vp and then scanned with a He—Ne laser (633 nm) for stimulation. Stimulated emission radiated from the phosphor layer was received by the photo-receiver described above and converted to electric signals, which were reproduced as an image by an image reproduction apparatus and printed out using an outputting apparatus. The thus obtained printed image was visually evaluated as a measure of shock resistance. Results thereof are shown in Table 1.

Shock resistance was visually evaluated based on the following criteria:

A: no cracking was observed and a uniform image was obtained,

B: no cracking was observed but at a feeling level of being little conscious of image quality deficiency, C: cracking was observed and slight image deficiency was noted but at a level acceptable in practice, D: cracking was apparently observed and image deficiency was noted, and a level unacceptable in practice.

TABLE 1

| | Distance*1 (mm) | Temperature of Support (° C.) | Vacuum (Pa) | Layer Thickness (μm) | Transmittance (%) 440 nm | Transmittance (%) 680 nm | Shock Resistance |
|---|---|---|---|---|---|---|---|
| Example 1 | 800 | 100 | $1 \times 10^{-1}$ | 500 | 18 | 20 | A |
| Example 2 | 400 | 100 | $1 \times 10^{-1}$ | 500 | 14 | 16 | A |
| Example 3 | 800 | 100 | $1 \times 10^{-2}$ | 500 | 23 | 25 | B |
| Example 4 | 1000 | 100 | $1 \times 10^{-1}$ | 500 | 20 | 22 | A |
| Example 5 | 1000 | 100 | $1 \times 10^{-1}$ | 300 | 28 | 30 | B |
| Example 6 | 1000 | 150 | $1 \times 10^{-1}$ | 500 | 25 | 27 | B |
| Comp. Example 1 | 800 | 200 | $1 \times 10^{-3}$ | 500 | 35 | 38 | D |
| Comp. Example 2 | 800 | 200 | $1 \times 10^{-3}$ | 300 | 40 | 42 | C |

As can be seen from Table 1, it was proved that Examples 1 to 6 met the requirement (1) regarding a thickness (A) of a stimulable phosphor layer and transmittance (B) of stimulating light or stimulated emission, exhibiting superior shock resistance. On the contrary, Comparative Examples 1 and 2 were inferior in shock resistance.

Comparative Examples 3 and 4

Figure 6:
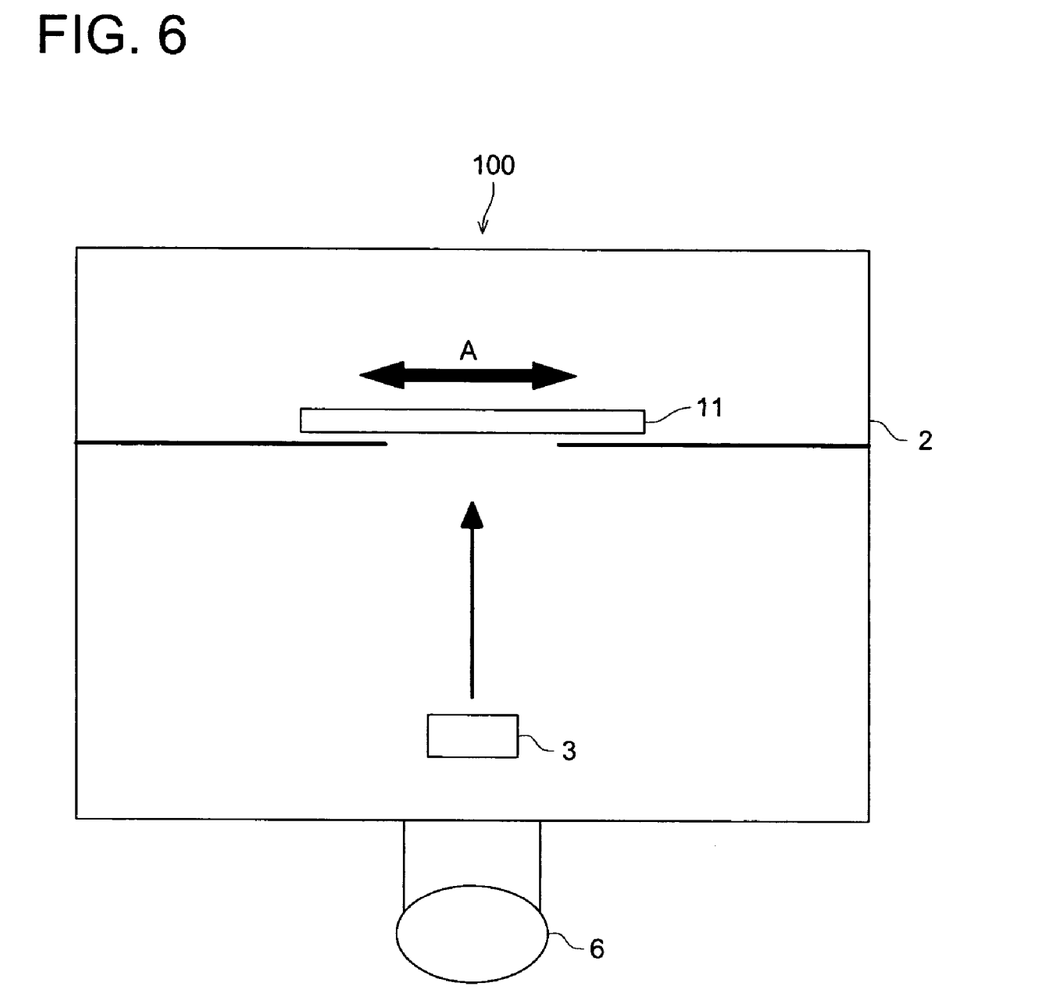

Radiation image conversion panel and its sample used for transmittance measurement were prepared similarly, provided that the deposition apparatus (1) was replaced by a deposition apparatus (100) as shown in FIG. 6, in which a support (11) was reciprocated in the direction as designated by "A". The deposition apparatus (100) was provided with a transport mechanism of holding and reciprocating the support (11) in the direction parallel to the surface of the support (11), in place of support holder (4) and support rotation mechanism (5) of the deposition apparatus (1), and an aluminum slit (7) was also provided between evaporation source (3) and the support (11). In FIG. 6, numerals 2 and 6 designate vacuum vessel and vacuum pump.

Radiation image conversion panel Examples 1 and 4, and Comparative Examples 3 were determined with respect to distribution of transmittances, based on the foregoing equation (5). Results thereof are shown in Table 2, together with distribution characteristics.

Further, these panels were evaluated with respect to unevenness in sensitivity in the following manner. Thus, each of the panels was exposed to X-rays at a bulb voltage of 80 kVp from the opposite side of the support to the stimulable phosphor layer and then stimulated by scanning with He—Ne laser light (633 nm). At 25 measuring points arranged at regular intervals, stimulated emission emitted from the stimulable phosphor layer was detected by a detector (photomultiplier having a spectral sensitivity of S-5) to determine the intensity. Unevenness in sensitivity to evaluate scattering in intensity was represented by the difference between maximum and minimum luminance values, divided by an average value, which was expressed by percentage. Results thereof were shown in Table 1.

TABLE 2

| | Deposition Apparatus | Distance*1 (mm) | Distribution Characteristic | Transmittance Distribution (%) 440 nm | Transmittance Distribution (%) 680 nm | Unevenness in Sensitivity (%) | Shock Resistance |
|---|---|---|---|---|---|---|---|
| Example 1 | rotation | 800 | Isotropic | 10 | 12 | 10 | A |
| Example 4 | rotation | 1000 | Isotropic | 8 | 7 | 8 | A |
| Comp. Example 3 | transport | 1000 | Isotropic | 22 | 24 | 30 | D |
| Comp. Example 4 | transport | 400 | anisotropic | 30 | 28 | 38 | D |

*1Distance between support and evaporation source

As can be seen from Table 2, it was shown that when the transmittance distribution defined in equation (5) was not more than 20%, unevenness in sensitivity was prevented. It was further shown that as the transmittance distribution value decreased or transmittances of the phosphor layer became uniform, unevenness in sensitivity reduced.

What is claimed is:

1. A radiation image conversion panel comprising a support having thereon a stimulable phosphor layer comprising columnar crystals of a stimulable phosphor, wherein the stimulable phosphor layer meets the following requirement (1):

$$0 \leq B \leq 90 A^{-0.17} \quad (1)$$

wherein A is a thickness (μm) of the stimulable phosphor layer and B is a transmittance (%) of a stimulating light or a stimulated emission, and wherein a transmittance distribution of a stimulating light or a stimulated emission falls within 20% with respect to the stimulable phosphor layer.

2. The radiation image conversion panel of claim 1, wherein B is a transmittance of a stimulating light.

3. The radiation image conversion panel of claim 1, wherein B is a transmittance of a stimulated emission.

4. The radiation image conversion panel of claim 1, wherein the transmittance of a stimulating light is greater than that of a stimulated emission.

5. The radiation image conversion panel of claim 1, wherein the transmittance distribution is represented by the following formula:

transmittance distribution (%)=[(max−min)/(max+min)]×100 wherein "max" and "min" represent maximum and minimum values of transmittance, respectively, when transmittance was measured at 30 points within the stimulable phosphor layer.

6. The radiation image conversion panel of claim 1, wherein the stimulable phosphor is represented by the following formula (1)

$$M^1 X \cdot a M^2 X'_2 \cdot b M^3 X''_3 : eA \quad (1)$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each are a halogen atom selected from the group consisting of F, Cl, Br and I; A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are respectively $0 \leq a < 0.5$, $0 \leq b < 0.5$ and $0 < e \leq 0.2$.

7. The radiation image conversion panel of claim 1, wherein the stimulable phosphor is CsBr:eEu in which e is $0 < e \leq 0.2$.

8. A method of preparing a radiation image conversion panel comprising on a support a stimulable phosphor layer, the method comprising:

depositing a stimulable phosphor onto the support to form the stimulable phosphor layer comprising columnar crystals of the stimulable phosphor, wherein the stimulable phosphor layer meets the following requirement (1):

$$0 \leq B \leq 90 A^{-0.17} \quad (1)$$

wherein A is a thickness (μm) of the stimulable phosphor layer and B is a transmittance (%) of a stimulating light or a stimulated emission, and wherein a transmittance distribution of a stimulating light or a stimulated emission falls within 20% with respect to the stimulable phosphor layer.

9. The method of claim 8, wherein B is a transmittance of a stimulating light.

10. The method of claim 8, wherein B is a transmittance of a stimulated emission.

11. The method of claim 8, wherein the transmittance of a stimulating light is greater than that of a stimulated emission.

12. The method of claim 8, wherein the transmittance distribution is represented by the following formula:

transmittance distribution (%)=[(max−min)/(max+min)]×100 wherein "max" and "min" represent maximum and minimum values of transmittance, respectively, when transmittance was measured at 30 points within the stimulable phosphor layer.

13. The method of claim 8, wherein the stimulable phosphor is represented by the following formula (1):

$$M^1 X \cdot a M^2 X'_2 \cdot b M^3 X''_3 : eA \quad (1)$$

wherein $M^1$ is at least one alkali metal atom selected from the group consisting of Li, Na, K, Rb and Cs; $M^2$ is at least one divalent metal atom selected from the group consisting of Be, Mg, Ca, Sr, Ba, Zn, Cd, Cu and Ni; $M^3$ is at least one trivalent metal atom selected from the group consisting of Sc, Y, La, Ce, Pr, Nd, Pm, Sm, Eu, Gd, Tb, Dy, Ho, Er, Tm, Yb, Lu, Al, Ga and In; X, X' and X" each are a halogen atom selected from the group consisting of F, Cl, Br and I; A is at least one metal atom selected from the group consisting of Eu, Tb, In, Ce, Tm, Dy, Pr, Ho, Nd, Yb, Er, Gd, Lu, Sm, Y, Tl, Na, Ag, Cu and Mg; a, b and e are respectively $0 \leq a < 0.5$, $0 \leq b < 0.5$ and $0 < e \leq 0.2$.

14. The method of claim 8, wherein the stimulable phosphor is CsBr:eEu in which e is $0 < e \leq 0.2$.

* * * * *